UNITED STATES PATENT OFFICE.

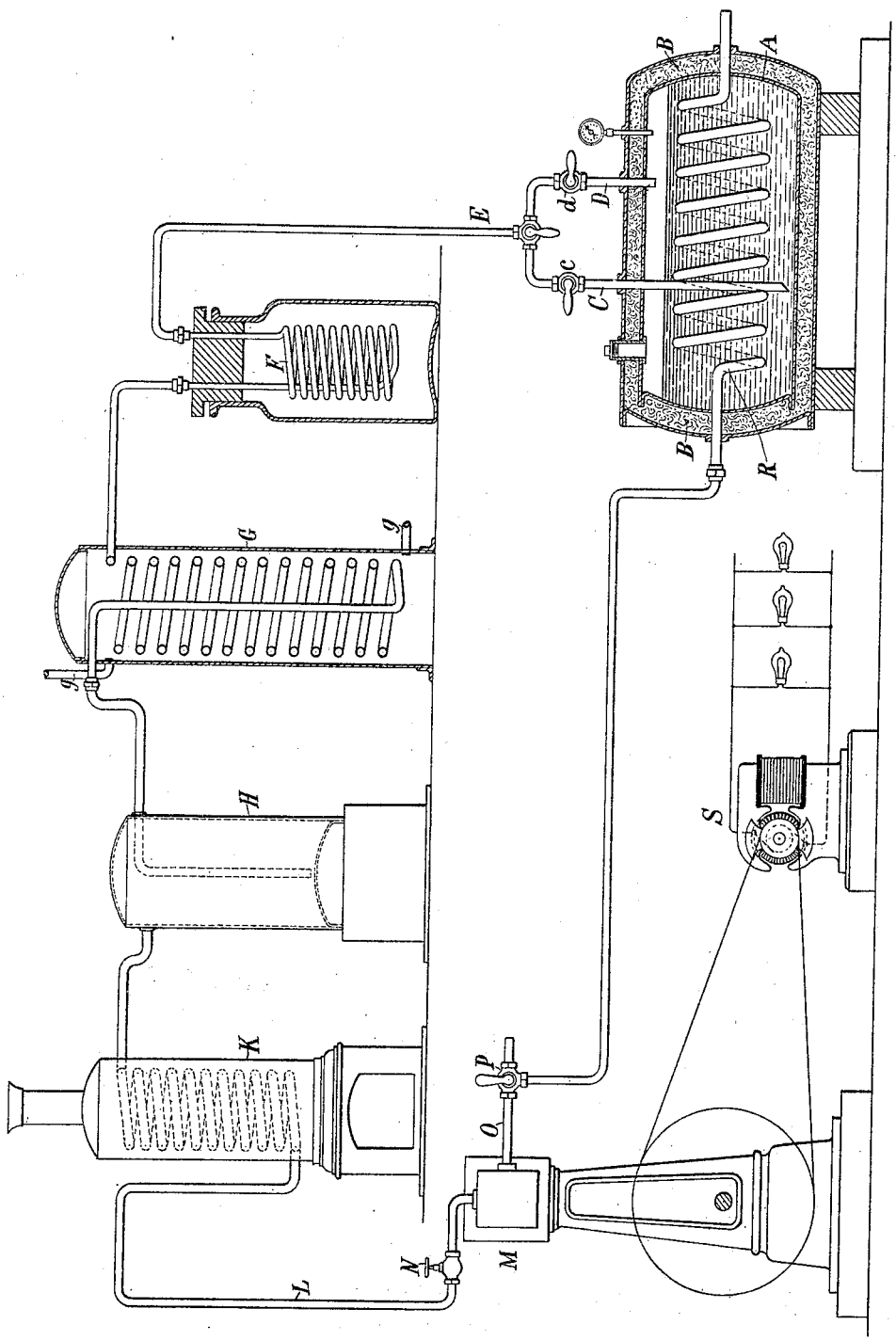

GABRIEL A. BOBRICK, OF LOS ANGELES, CALIFORNIA.

SYSTEM FOR UTILIZING LIQUID AIR OR OTHER GASES FOR PURPOSES OF REFRIGERATION AND POWER.

SPECIFICATION forming part of Letters Patent No. 683,010, dated September 17, 1901.

Application filed November 8, 1900. Serial No. 35,880. (No model.)

*To all whom it may concern:*

Be it known that I, GABRIEL A. BOBRICK, a citizen of the United States, and a resident of Los Angeles, in the county of Los Angeles and State of California, have invented certain new and useful Improvements in Systems for Utilizing Liquid Air or other Gases for Purposes of Refrigeration and Power, of which the following is a specification, reference being had to the drawing accompanying and forming a part of the same.

In order that the nature, object, and manner of application of the invention which forms the subject of my present application may be most readily comprehended, I shall describe a plant for refrigeration and power which I have designed for use in breweries, large hotels, and the like.

Selecting a modern hotel as a specific illustration, it will be assumed that as a complete refrigerating plant is of as much importance as the proper power for running the elevators and electric lamps a large power plant for operating both is essential; but since under the conditions existing heretofore the two are run independently the expenditure of power will be proportionate to the aggregate of the demands on each. The problem which I have sought to solve by my improvements is to obtain power and refrigeration more economically than has heretofore been possible and to operate both plants conjointly. This I accomplish in the following manner: In lieu of the boilers and engines ordinarily employed I prefer to install simply a receiver or "boiler" for liquid air or other gas, into which the latter, obtained from a large central or supply plant, may be introduced from suitable containing vessels in such quantity as may be necessary. This means of obtaining a supply of the liquid is not, however, necessary, as the hotel, if so desired, may be equipped with an engine and liquefier. In either case the main advantages attendant upon the use of my invention will be secured. Starting, however, with a suitable receiver or boiler for the liquefied gas as the first prerequisite of the system, I construct it so as to be capable of withstanding a high pressure and insulate it as far as practicable to exclude the heat of the surrounding atmosphere, so that there may be very little evaporation of the liquid when the plant is not in operation. I connect with it two pipes or tubes, each provided with a controlling or check valve, one of said pipes opening in the upper and the other in the lower part of the boiler, or above and below the level of the liquid therein, respectively. These two pipes preferably join in a single feed-pipe immediately beyond the valves, a three-way cock being placed at the junction, and lead to a series of refrigerating-coils located in any suitable compartment or cold-storage chamber or arranged in any other manner for purposes of refrigeration. The feed-pipe is continued from the said refrigerating-coils to an expander, which may be a coil or series of coils contained in a vessel filled with or through which there is maintained in circulation a liquid of high specific heat. Water will answer the purpose, but brine is preferable. From the coils of the expander a pipe leads to a storage tank or reservoir for containing a comparatively large body of air or gas, and this latter is connected through suitable piping with an engine or engines either directly or preferably through a coil or set of coils arranged to be exposed to artificial heat and which may be designated as a "superheater;" but as this device is not essential it may be omitted. From the exhaust of the engine a pipe leads to a coil inside the boiler and immersed in the liquid therein, the other end of this coil connected with other refrigerating apparatus or with devices for collecting and condensing the gas which issues from it, as will be more fully explained. The plant thus generally described is illustrated diagrammatically in the accompanying drawing.

A represents the receiver or boiler for liquefied gas, shown as surrounded with a jacket of mineral wool or other insulating material B and provided with two pipes C and D, containing controlling-valves *c* and *d*, respectively. The two pipes unite in a feed-pipe E, which leads to the refrigerating-coils F, thence to the expander G, shown as provided with inlet and outlet ports *g* for the circulation of a suitable liquid, thence to the storage-tank H, and thence to the superheater K, which may be of any ordinary construction. Preferably the inlet of the storage-tank is at one end and the outlet at the other, as indicated. The pipe L connects the outlet of the said tank or the superheater with an engine M and contains a throttle-valve N. The exhaust-pipe O from the engine contains a two-way cock P, which controls two branches, one of which may open directly to the air, while the other connects with a coil R within the boiler. It is understood that the engine may be used to run a dynamo S or any other suitable device.

What takes place in such a plant is the following: There will be a certain evaporation of the liquid in the boiler A under all circumstances, and this producing a pressure in the space above the liquid forces some of the liquid up through the pipe C if the valve in the same be open and the valve in pipe D be not opened sufficiently to prevent the rise of pressure. In other words, whatever may be the rate of evaporation in the boiler A the rate at which the liquid is forced up therefrom through pipe C into the pipe E and the refrigerating-coils may always be determined by the relative adjustment of the two valves $c$ and $d$. The escaping gas in pipe D and the liquid in pipe C pass up through pipe E to and through the refrigerating-coils F and from these into the coils of the expander G. Here the gas which still remains in liquid form takes up from the brine or other liquid surrounding the coils sufficient heat to evaporate it and very greatly increase its volume, and if it be then passed into the storage-tank H it continues to take up heat from the atmosphere until its temperature rises to about that of the latter. After having done its work in the engine the air or gas will be reduced in temperature; but this will still be very much higher than that of the liquid in the boiler, so that if passed through the coil R in the latter it will cause the liquid to boil. After thus giving up its sensitive heat it issues from the coil in the state of a vapor at about the temperature of liquid air and may be used for further purposes of refrigeration. For example, it may be passed through the system of steam heating-pipes in summer in order to cool such apartments or spaces as may be necessary or used in any other way in which its low temperature may be taken advantage of. If liquid air be used in the boiler, then the liquid and the product of evaporation will during the process vary as to the proportion of nitrogen and oxygen. At the beginning the mixture of evaporating gases will be rich in nitrogen and poor in oxygen, then it will become richer and richer in oxygen, and finally it will become almost pure oxygen. This is of course due to the fact that the boiling-point of nitrogen is by about 24° Fahrenheit lower than that of oxygen. The frozen carbon dioxid present in the liquid air may be removed from the liquid before it is brought into the boiler, or it may be removed from the boiler as a residue, or it may be allowed to evaporate and used for refrigeration and power in the same manner as the liquid air. The oxygen gas or the gas rich in oxygen after it has done work in the engine or after it has effected a second refrigeration may be collected and stored in suitable vessels, or it may be used to promote the combustion of coal or some inferior fuel for cooking or heating, or it may be used for refreshing the air in the rooms.

In a plant thus arranged it will be seen that the heat necessary for the expansion of the liquid is or may be derived solely from the atmosphere, so that if refrigeration be the main object the power will be in the nature of a by-product and, conversely, so that given a supply of liquefied gas the two processes are carried on nearly as economically as one.

My system is applicable, as above stated, to breweries, hotels, cold-storage warehouses, and any other establishments where both refrigeration and power are necessary or desirable.

The invention, while depending on well-known principles, does not of course involve simply the use of a liquefied gas for refrigeration nor an expanded gas for power, but resides in the system as a whole or the combination of the several elements arranged in substantially the manner described for utilizing a liquefied gas for the two purposes of power and refrigeration.

What I claim as my invention is—

1. In a combined power and refrigerating plant the combination of a receiver or boiler for containing liquid air, a refrigerating apparatus connected with the boiler, an expander into which the gas passes from the refrigerating apparatus, an engine adapted to be operated by the expanded gas, and means for conducting the gas from the exhaust of the engine to the boiler so as to evaporate the liquid therein, substantially as herein set forth.

2. In a combined power and refrigerating plant the combination of a receiver or boiler for containing liquid air, a refrigerating apparatus connected therewith, means for regulating the flow of liquid from the boiler to the refrigerating apparatus, an expander into which the gas from the refrigerating apparatus passes, an engine adapted to be operated by the expanded gas, and means for evaporating the liquid in the boiler by the gas from the exhaust of the engine, substantially as set forth.

3. In a combined power and refrigerating plant the combination of a receiver or boiler for containing liquid air, a refrigerating apparatus connected therewith, means for regulating the flow of liquid from the boiler to the refrigerating apparatus, means for expanding the gas after it has passed through the refrigerating apparatus, a storage-tank for the expanded gas, an engine connected therewith and means for evaporating the liquid in the boiler by the gas from the exhaust of the engine, as set forth.

4. In a combined power and refrigerating plant the combination of a receiver or boiler for containing liquid air, a refrigerating apparatus connected therewith, means for regulating the flow of liquid from the boiler to the refrigerating apparatus, means for expanding the gas after it has passed through the refrigerating apparatus, a superheater or device for applying artificial heat to the expanded gas, a storage-tank for the expanded gas, an engine connected therewith, and means for evaporating the liquid in the boiler by the gas from the exhaust of the engine, as set forth.

5. In a combined power and cold-storage plant the combination of a receiver or boiler for containing liquid air, a refrigerating-coil connected therewith, means for regulating the flow of liquid from the boiler to the refrigerating-coil, an expansion-coil into which the gas from the refrigerating-coil is conducted, a device for storing and an engine for utilizing the expanded gas and a coil within the boiler through which the exhaust-gas from the engine is conducted, as and for the purposes set forth.

GABRIEL A. BOBRICK.

Witnesses:
DRURY W. COOPER,
M. LAWSON DYER.